3,526,540
COATING OF WOVEN FABRICS AND THE LIKE
Martin K. Lindemann, Somerville, and Rocco P. Volpe, Newark, N.J., assignors, by mesne assignments, to Air Reduction Company, Incorporated, New York, N.Y., a corporation of New York
Continuation of application Ser. No. 444,387, Mar. 31, 1965. This application Sept. 23, 1968, Ser. No. 781,657
Int. Cl. C08f *19/10, 45/24;* C08j *1/44*
U.S. Cl. 117—161                                    3 Claims

ABSTRACT OF THE DISCLOSURE

Woven fabrics are coated by means of a coating composition comprising an interpolymer of vinyl acetate, ethylene, and allyl glycidyl ether, the interpolymer containing 5 to 40% ethylene and the allyl glycidyl ether being present in an amount of at least about 0.5% based on the vinyl acetate, the coating composition being a dispersion of the interpolymer in water with the interpolymer preferably having a particle size of $0.1\mu$ to $2\mu$.

---

This is a continuation of our application Ser. No. 444,387, filed Mar. 31, 1965 (now abandoned).

This invention relates to the treatment of woven fabrics and is more particularly concerned with the application to woven fabrics of a water-resistant and solvent-resistant coating finish to improve the body and drape of the fabrics.

The coating, e.g. back coating, and finishing of woven fabrics are well-known operations and various compositions for such use have been proposed and are used in practice. However, it is important, for optimum results, that the coating or finish applied be water-resistant and solvent-resistant and that it adhere firmly to the fibers of the woven fabric so that it will not be removed from the woven fabrics when they are washed or dry cleaned, and it is desired to have coating or finishing agents which will remain on the woven fabrics and will be effective for their intended purposes through many washing or cleaning cycles. Attempts to meet these requirements has often involved the provision of relatively complex and expensive compositions which necessarily increase the cost of the finished product.

It is accordingly an object of this invention to provide new, improved compositions for application to woven fabrics.

It is a further object of the present invention to provide a polymeric coating which, when applied to woven fabrics, gives the desired character to the fabrics, yet which is highly resistant to washing and cleaning and, at the same time, is economically attractive.

In accordance with the present invention, woven fabrics, whether formed from natural fibers such as cotton, wool, linen and the like, or from synthetic fibers such as cellulose acetate, nylon, dacron, and the like, or of mixtures of natural and/or synthetic fibers, are given a desirable body and drape by applying to them a polymeric latex having characteristics which will be described below and drying the latex to remove its liquid component and to leave upon the woven fabrics a deposit of a water-resistant and solvent-resistant polymeric coating.

The latex used in accordance with the invention contains as the polymeric component an interpolymer of vinyl acetate and ethylene copolymerized with allyl glycidyl ether which is effective to polymerize and to cross-link with the initial vinyl acetate and ethylene containing interpolymer under the action of heat. The above-described composition is applied to the woven fabric web in the form of an aqueous latex containing the interpolymer of vinyl acetate, ethylene and copolymerized allyl glycidyl ether in the dispersed phase. The vinyl acetate-ethylene-allyl glycidyl ether interpolymer is characterized by an ethylene content of 5 to 40%, preferably 16 to 40%, a particle size of 0.1 to 2 $\mu$, preferably 0.1 to 0.25 $\mu$, and an intrinsic viscosity of 1 to 2.5 dl/g. The amount of allyl glycidyl ether is 0.5 to 10% based on the vinyl acetate.

The composition is readily prepared by the interpolymerization of vinyl acetate, ethylene and allyl glycidyl ether in an aqueous dispersion system. The allyl glycidyl ether readily copolymerizes with the vinyl acetate and the ethylene to form an interpolymer or terpolymer but, as mentioned, is adapted to undergo further reaction after this initial polymerization upon the application of heat in the processing of the fabric to further cross-link the interpolymer. Particular suitable is a vinyl acetate-ethylene-allyl glycidyl ether interpolymer latex which is prepared by the following process.

Vinyl acetate and ethylene are copolymerized in the presence of the allyl glycidyl ether in an aqueous medium under pressures not exceeding 100 atmospheres in the presence of a catalyst and at least one emulsifying agent, the aqueous system being maintained, by a suitable buffering agent, at a pH of 2 to 6, the catalyst being added incrementally. The process is a batch process which involves first a homogenization period in which the vinyl acetate suspended in water is thoroughly agitated in the presence of ethylene under the working pressure to effect solution of the ethylene in the vinyl acetate up to the substantial limit of its solubility under the conditions existing in the reaction zone, while the vinyl acetate is gradually heated to polymerization temperature. The homogenization period is followed by a polymerization period during which the catalyst, which consists of a main catalyst or initiator, and may include an activator, is added incrementally, and the allyl glycidyl ether is similarly added incrementally, the pressure in the system being maintained substantially constant by application of a constant ethylene pressure.

Various free-radical forming catalysts can be used in carrying out the polymerization of the monomers, such as peroxide compounds. Combination type catalysts employing both reducing agents and oxidizing agents can also be used. The use of this type of combined catalyst is generally referred to in the art as "redox polymerization" or "redox system." The reducing agent is also often referred to as an activator and the oxidizing agent as an initiator. Suitable reducing agents or activators include bisulfites, sulfoxylates, or other compounds having reducing properties such as ferrous salts, and tertiary aromatic amines, e.g., N,N-dimethyl aniline. The oxidizing agents or initiators include hydrogen peroxide, organic peroxides such as benzoyl peroxide, t-butyl hydroperoxide and the like, persulfates, such as ammonium or potassium persulfate, perborates, and the like. Specific combination type catalysts or redox systems which can be used include hydrogen peroxide and zinc formaldehyde sulfoxylate; hydrogen peroxide, ammonium persulfate, or potassium persulfate, with sodium metabisulfite, sodium bisulfite, ferrous sulfate, dimethyl aniline, zinc formaldehyde sulfoxylate or sodium formaldehyde sulfoxylate. Other types of catalysts that are well-known in the art can also be used to polymerize the monomers, such the the peroxide compounds, with or without the addition of reducing agents or other activating materials. It is advantageous to utilize more water-soluble peroxides, such as hydrogen peroxide, rather than the more oil-soluble peroxides such as t-butyl hydroperoxide, in the redox system, to catalyze the monomer polymerization. Redox catalyst systems are described, for example, in "Fundamental Principles of Polymerization," by G. F. D'Alelio (John Wiley and Sons, Inc., New York, 1952) pp. 333 et seq. Other types of catalysts that are well-known in the art can also be used to polymerize the monomers according to this invention, with or without the addition of reducing agents or other activating materials.

The catalyst is employed in the amount of 0.1 to 2%, preferably 0.25 to 0.75%, based on the weight of vinyl acetate introduced into the system. The activator is ordinarily added in aqueous solution and the amount of activator is generally 0.25 to 1 times the amount of catalyst.

The emulsifying agents which are suitably used are nonionic. Suitable nonionic emulsifying agents include polyoxyethylene condensates. Polyoxyethylene condensates may be represented by the general formula:

$$R(CH_2-CH_2-O)_nH$$

where R is the residue of a fatty alcohol containing 10-18 carbon atoms, an alkyl phenol, a fatty acid containing 10-18 carbon atoms, an amide, an amine, or a mercaptan, and where $n$ is an integer of 1 or above. Some specific examples of polyoxyethylene condensates which can be used include polyoxyethylene aliphatic ethers such as polyoxyethylene lauryl ether, polyoxyethylene oleyl ether, polyoxyethylene hydroabietyl ether and the like; polyoxyethylene alkaryl ethers such as polyoxyethylene nonylphenyl ether, polyoxyethylene octylphenyl ether and the like; polyoxyethylene esters of higher fatty acids such as polyoxyethylene laurate, polyoxyethylene oleate and the like as well as condensates of ethylene oxide with resin acids and tall oil acids; polyoxyethylene amide and amine condensates such as N-polyoxyethylene lauramide, and N-lauryl-N-polyoxyethylene amine and the like; and polyoxyethylene thio-ethers such as polyoxyethylene n-dodecyl thio-ether.

The nonionic emulsifying agents which can be used according to this invention also include a series of surface active agents known as "Pluronics." The "Pluronics" have the general formula:

$$HO(C_2H_4O)_a(C_3H_6O)_b(C_2H_4O)_cH$$

where $a$, $b$, and $c$ are integers of 1 or above. As $b$ increases, the compounds become less water soluble or more oil soluble and thus more hydrophobic when $a$ and $c$ remain substantially constant.

In addition, highly suitable are a series of ethylene oxide adducts of acetylenic glycols sold commercially under the name Surfynols. This class of compounds can represented by the formula $$R_1-\underset{\underset{H(OCH_2CH)_yO}{|}}{\overset{\overset{R_2}{|}}{C}}-C\equiv C-\underset{\underset{O(CH_2CH_2O)_xH}{|}}{\overset{\overset{R_3}{|}}{C}}-R_4$$

in which $R_1$ and $R_4$ are alkyl radicals containing from 3 to 10 carbon atoms, $R_2$ and $R_3$ are selected from the group consisting of methyl and ethyl, $x$ and $y$ have a sum in the range of 3 to 60, inclusive.

Some examples of nonionic emulsifying agents which can be used are as follows:

A polyoxyethylene nonylphenyl ether having a cloud point of between 126 and 133° F. is marketed under the trade name "Igepal CO-630" and a polyoxyethylene nonylphenyl ether having a cloud point above 212° F. is marketed under the trade name "Igepal CO-887." A similar polyoxyethylene nonylphenyl ether having a cloud point of about 86° F. is marketed under the trade name "Igepal CO-610." A polyethylene octylphenyl ether having a cloud point of between 80° F. and 160° F. is marketed under the trade name "Triton X-100."

A polyoxyethylene oleyl ether having a cloud point of between 80° F. and 160° F. is marketed under the trade name "Atlas G-3915" and a polyoxyethylene lauryl ether having a cloud point above 190° F. is marketed under the trade name "Brij 35."

A polyoxypropylene having a cloud point of about 140° F. is marketed under the trade name "Pluronic L-64," and a polyoxypropylene having a cloud point of about 212° F. is marketed under the trade name "Pluronic F-68." "Pluronic L-64" is a polyoxyethylene-polyoxypropylene glycol conforming to the above general formula for "Pluronics" in which the polyoxypropylene chain has a molecular weight of 1500 to 1800 and the polyoxyethylene content is from 40 to 50 percent of the total weight of the molecule. "Pluronic F-68" is a polyoxyethylene-polyoxypropylene glycol conforming to the above general formula for "Pluronics" in which the polyoxypropylene chain has a molecular weight of 1500 to 1800 and the polyoxyethylene content is from 80 to 90 percent of the total weight of the molecule. The polyoxypropylene "Pluronics" are obtained by condensing ethylene oxide on the polyoxypropylene base and the hydrophobic-hydrophilic nature of the resulting compound is controlled by varying the molecular weight of either the hydrophobic base or the hydrophilic portion of the molecule.

Representative of the "Surfynols" are "Surfynol 465" which is an ethylene oxide adduct of 2,4,7,9-tetramethyl decynediol containing an average of 10 moles of ethylene oxide per mole, and "Surfynol 485" which corresponds to "Surfynol 465" but contains an average of 30 moles of ethylene oxide per mole. "Surfynol 465" has a cloud point of about 145° F. and "Surfynol 485" has a cloud point above 212° F.

In the foregoing, cloud points recited are based on 1% aqueous solutions. A single emulsifying agent can be used, or the emulsifying agents can be used in combination. When combinations of emulsifying agents are used, it is advantageous to use a relatively hydrophoric emulsifying agent in combination with a relatively hydrophilic agent. A relatively hydrophobic agent is one having a cloud point in 1% aqueous solution below 90° F. and a relatively hydrophilic agent is one having a cloud point in 1% aqueous solution of 190° F. or above.

The concentration range of the total amount of emulsifying agents useful is from 0.5 to 5% based on the aqueous phase of the latex regardless of the solids content. Latex stabilizers are also advantageously used. The stabilizers employed are, in part, governed by the use to which the copolymer latex is to be put, and/or the particle size of the copolymer. For example, the vinyl acetate ethylene copolymer latices prepared by the method described can have various average particle size ranges. When the latices are to have a small average particle size, e.g., below 0.25µ, as preferred in the present invenvention, an ethylenically-unsaturated acid having up to 6 carbon atoms, is advantageously used as the stabilizer. Typical acids of this character are acrylic acid, methacrylic acid, itaconic acid, maleic acid, vinyl sulfonic acid and the like. These unsaturated acids impart increased stability to the latices. They tend to copolymerize with the monomers in the system. The amount of unsaturated acid used is suitably 0.1 to 3% based on vinyl acetate, preferably 0.2 to 1%.

On the other hand, when the latex has an average particle size above 0.25µ, a protective colloid can be used in the polymerization mixture as the stabilizing agent, although an unsaturated acid can be used if desired. Various amounts of colloids can be incorporated into the latices as desired, but it is preferred to maintain the colloid concentration at the lowest level possible. The amount of colloid used will also depend upon the particular colloid employed. Colloids of higher molecular weight tend to produce a latex of a higher viscosity than like amounts of a lower molecular weight colloid. Other properties of the colloids aside from their molecular weight also affect the viscosity of the latices and also the properties of the films formed therefrom. It is advantageous to maintain the colloid content of the latices between about 0.05 and 2% by weight based on the total latex, and hydroxyethyl cellulose is a particularly advantageous colloid when used in the latices.

Various other colloids can also be used, including polyvinyl alcohol, partially-acetylated polyvinyl alcohol, e.g., up to 50% acetylated, casein, hydroxyethyl starch, carboxymethyl cellulose, gum arabic, and the like, as known in the art of synthetic polymer latex technology.

In order to maintain the pH of the system at the desired value, there is suitably added an alkaline buffering agent of any convenient type. Any alkaline material which is compatible with the stabilizing agent can be used as the buffer. The amount of buffer is that sufficient to adjust the pH of the system within the desired range. Ammonium and sodium bicarbonate are preferred buffers because of their compatibility with the system and their low cost. The amount of buffer is generally about 0.1 to 0.5% by weight, based on the monomers. Other buffers such as disodium phosphate, sodium acetate, and the like, can, however, also be used.

One of the features of the method described above is that latices of relatively high solids contents can be directly produced and thus the products generally have, as produced, solids contents of 45 to 60%. They can, of course, be easily thinned by the addition of water to lower solids contents of any desired value.

Lower reaction temperatures for polymerizing vinyl acetate than have heretofore been feasible economically can also be used. The use of lower reaction temperatures has been found to result in higher molecular weight vinyl acetate copolymers. The reaction temperature can be controlled by the rate of catalyst addition and by the rate of the heat dissipation therefrom. Generally we have found that it is advantageous to maintain a mean temperature of about 50° C. during the polymerization of the monomers and to avoid temperatures much in excess of 80° C. While temperatures as low as 0° can be used, economically the lower temperature limit is about 30° C.

The reaction time will also vary depending upon other variables such as the temperature, the catalyst, and the desired extent of the polymerization. It is generally desirable to continue the reaction until less than 0.5% of the vinyl acetate and allyl glycidyl ether remains unreacted. Under these circumstances, a reaction time of about 6 hours has been found to be generally sufficient for complete polymerization, but reaction times ranging from 3 to 10 hours have been used, and other reaction times can be employed, if desired.

In carrying out the polymerization, a substantial amount of the vinyl acetate is initially charged to the polymerization vessel and saturated with ethylene in the manner discussed above. Most advantageously, at least about 75% of the total vinyl acetate to be polymerized is initially charged, preferably at least about 85%, and the remainder of the vinyl acetate is incrementally added during the course of the polymerization. The charging of all of the vinyl acetate initially is also contemplated, with no additional incremental supply. When reference is made to incremental addition, whether of vinyl acetate, allyl glycidyl ether, catalyst, or activator, substantially uniform additions, both with respect to quantity and time, are contemplated.

The quantity of ethylene entering into the copolymer is influenced by the pressure, the agitation, and the viscosity of the polymerization medium. Thus, to increase the ethylene content of the copolymer, higher pressures are employed, but even to introduce 40% or more of ethylene into the copolymer, pressures in excess of 100 atms. are not required. However, a pressure of at least about 10 atms. is most suitably employed. Similarly, when high ethylene contents are desired, a high degree of agitation should be employed, and high viscosities should be avoided, a low viscosity being preferred. When referring to viscosities, a viscosity of 30 to 150 centipoises is considered a low viscosity, a viscosity of 151 to 800 centipoises is considered a medium viscosity, and a viscosity of 801 to 3000 centipoises is considered a high viscosity.

The process of forming the vinyl acetate-ethylene-allyl glycidyl ether interpolymer latices generally comprises the preparation of an aqueous solution containing at least some of the emulsifying agent and stabilizer, and the pH buffering system. This aqueous solution and the initial charge of vinyl acetate are added to the polymerization vessel and ethylene pressure is applied to the desired value. As previously mentioned, the mixture is thoroughly agitated to dissolve ethylene in the vinyl acetate and in the water phase, agitation being continued until substantial equilibrium is achieved. This generally requires about 15 minutes. However, less time may be required depending upon the vessel, the efficiency of agitation, the specific system, and the like. In any case, by measuring the pressure drop of the ethylene in conventional manner, the realization of substantial equilibrium can be easily determined. Conveniently the charge is brought to polymerization temperature during this agitation period. Agitation can be effected by shaking, by means of an agitator, or other known mechanism. The polymerization is then initiated by introducing initial amounts of the catalyst, and of the activator when used. After polymerization has started, the catalyst and the activator are incrementally added as required to continue polymerization, and the allyl glycidyl ether and the remaining vinyl acetate, if any is similarly added.

As mentioned, the reaction is generally continued until the residual vinyl acetate and allyl glycidyl ether content is below 0.5%. The completed reaction product is then allowed to cool to about room temperature, while sealed from the atmosphere. The pH is then suitably adjusted to a value in the range of 4.5 to 7, preferably 6 to 6.5 to insure maximum stability.

The particle size of the latex can be regulated by the quantity of nonionic emulsifying agent or agents employed and by the use or nonuse of a colloidal stabilizing agent. Thus, to obtain smaller particle sizes, greater amounts of emulsifying agent are used and colloidal stabilizing agents are not employed. For example, to provide average particle sizes below about 0.25, the total amount of nonionic emulsifying agent should be at least about 2%, based on the aqueous phase of the latex, and no colloidal stabilizing agent should be used, or if a colloidal stabilizing agent is used, only very small amounts should be employed.

On the other hand, when particle sizes of 0.25 and above are desired, at most about 2% of total emulsifying agent based on the aqueous phase of the latex should be used, and a colloidal stabilizing agent should be included in the amounts previously indicated. As a general rule, the smaller the amount of emulsifying agent employed and the greater the amount of colloidal stabilizing agent included in the latex system, the greater the average particle size. Conversely, the greater the amount of the emulsifying agent employed and the smaller the amount of colloidal stabilizing agent use, including the total absence of the latter, the smaller the average particle size. It will be understood that in each case, the quantity and size values referred to above are all within the ranges of values previously specified.

By following the procedure described above, particularly the initial saturation of the polymerization mixture with ethylene before polymerization is initiated, there can be produced the stable vinyl acetate-ethylene-allyl glycidyl ether interpolymer latex characterized above, with the copolymer having an ethylene content of 5 to 40%, an intrinsic viscosity of 1 to 2.5 dl./g., and an average particle size of 0.1 to 2, and the latex having a high solids content of up to 60% or more.

The ethylene content can be determined by means of the saponification number.

Intrinsic viscosity is suitably determined by convention techniques, e.g., in accordance with the procedure described on pages 309–314 of "Principles of Polymer Chemistry," by Paul J. Flory (Cornell University Press—1963); using an Ubbelohde (suspended level) Viscometer at 30° C.

The vinyl acetate-ethylene-allyl glycidyl ether interpolymer latex described above is readily applied to a woven fabric to provide a back-coating or similar coating which will give body, or fullness, or drape, or like desirable characteristics, to the fabric, e.g., an upholstery fabric, by conventional coating means employed in the woven fabric art. Particularly suitable for application of the latex to the woven fabric is the so-called licker-on apparatus, wherein a trough contains the latex to be applied and is fitted with a rotatable roll, which is partially immersed in the latex. The fabric to be coated is passed across the upper portion of the roll which is above the level of the latex in the trough but carries a film or coating of the latex which is transferred to the woven fabric in conventional manner. Conventional spray apparatus may also be employed, or the latex may be applied in any other convenient manner.

The latex is suitably at a temperature of the order of 120° to 140° F. while it is in the licker-on trough and is being applied to the fabric. The rate of application can be readily controlled in known manner and the quantity applied to the fabric will depend upon individual conditions and the individual fabric being treated. Ordinarily, for service as a back-coating, the latex is applied at such a rate that the solids content of the coating is of the order of 5-6% based on the weight of the fabric. The solids content of the latex itself can also vary, but it is generally advantageous to have a solids content of the order of 50%. If the latex, as produced, has a higher solids content, or if an even lower solids content is desired, the appropriate solids content can readily be attained by appropriate dilution of the latex with water.

After the coating has been applied, the fabric is subjected to a drying stage and a curing stage. The drying stage is ordinarily carried out at a temperature of the order of 240° to 250° F. for a period of time of the order of 2 minutes, and the curing stage is conveniently carried out at a temperature in the neighborhood of 300° to 310° F. for a period of time of the order of 3 minutes. However, other time-temperatures relationships can be employed, as is well known in the art, shorter times at higher temperatures or longer times at lower temperatures being used. For example, the curing step can be carried out at 280° F. for about 15 min. or more. However, economic considerations make the use of excessively long times undesirable, and the upper temperature limit is governed by the nature of the fabric. Temperatures which degrade the fabric are, of course, avoided. However, if the fabrics are heat resistant, temperatures as high as 350° F. or higher can be used with times of 5-10 min. or more. If desired, the drying and curing can be effected in a single exposure or step, e.g., at 300° F. for 5-10 min. In the curing, the allyl glycidyl ether completes its polymerization and cross-links in the resin. To facilitate this poly-polymerization, the latex has mixed with it, before it is applied to the fabric, a suitable catalyst for the allyl glycidyl ether. Thus, basic catalysts such as organic amines, e.g., ethylenediamine and piperidine, or metal salts of weak acids, such as sodium acetate or zinc fluoborate are suitably used, as known in the art. The amount of catalyst is generally about 0.5 to 2% of the total resin.

Woven fabrics coated with the resinous latex described above exhibit the desirable characteristics indicated, and retain these characteristics, since the polymeric coating deposited from the latex will withstand numerous contacts with water or dry cleaning solvents, e.g., chlorinated hydrocarbons.

The following examples are given to illustrate the present invention, but it will be understood that they are intended to be illustrative only and not limitative of the invention. In the examples, all parts are by weight unless otherwise indicated.

EXAMPLE 1

The following was charged to a 25 gal. stainless steel pressure reactor equipped with temperature controls and an agitator:

|  | G. |
|---|---|
| Vinyl acetate | 36,000 |
| Water | 33,000 |
| Igepal 887 | 1,020 |
| Igepal 630 | 510 |
| Ferrous ammonium sulfate (1% solution) | 5 |
| Sodium lauryl sulfate | 5 |

After purging with nitrogen and ethylene, 105 g. potassium persulfate was added to the mixture. The agitator was set at 300 r.p.m. and the kettle pressurized with ethylene to 40 atm. After reaching equilibrium and after heating to 50° C. the agitation was reduced to 195 r.p.m. and polymerization was started by adding 20 cc. of a 0.5% solution of Formopon. During the polymerization 139 g. of maleic acid and 1800 g. of allyl glycidyl ether were added incrementally in addition to 136 g. of potassium persulfate which was also added incrementally as needed. The polymerization was complete after 4½ hrs. The latex was cooled and neutralized with ammonia to a pH of 5.2. The latex had the following properties:

Solids—47.3
Ethylene in copolymer—21%
$T_{135} = -5°$ C.
$T_4 = +4°$ C.
Intrinsic viscosity=0.29 (100 ml./g., benzene, 30° C.)
Particle size=less than $0.18\mu$ The above-described latex was diluted to 10% solids, 2% sodium acetate (based on the weight of solids) was added and the latex applied to an 80 x 80 print cloth fabric. The latex was applied at the rate of about 18% (solids) based on the weight of the fabric. The fabric was then dried and cured on a pin frame at 300° F. for 6 min., and then 5% zinc fluoborate was added and curing continued at 350° F. for 5 min.

The cured fabric was then subjected to a 1-hr. accelerated washing test at a temperature of 160° F. employing an AATCC Launder Ometer, in accordance with Standard Test Method 61–1962 as set forth on pages B–76 and B–77 of the 1962 Technical Manual of the American Association of Textile Chemists and Colorists, with the sample being tumbled in a stainless steel cylinder containing 100 stainless steel balls and the wash solution. The coating was found to be completely intact after the washing operation.

EXAMPLE 2

The above-described procedures with respect to the preparation of a coated fabric were repeated, except that the coating used was a vinyl acetate homopolymer latex initially having a solids content of 48.7 and a pH of 6–6.5, and no zinc fluoborate was added. At the end of the washing test, the fabric retained only a portion of its coating and had failed the test.

In the characterization of the interpolymer of Example 1, $T_{135}$ is the temperature at which the torsional modulus is 135,000 lbs./in.$^2$, and $T_4$ the temperature at which the torsional modulus is 10,000 lbs./in.$^2$ determined according to ASTM–D1043–61T.

It will be apparent that various changes and modifications may be made in the embodiments of the invention described above, without departing from the scope of the invention, as defined in the appended claims, and it is intended, therefore, that all matter contained in the foregoing description shall be interpreted as illustrative only and not as limitative of the invention.

What is claimed is:

1. A coated woven fabric having on at least one face thereof a coating comprising an emulsion polymerized interpolymer of vinyl acetate-ethylene-allyl glycidyl ether, the ethylene in said interpolymer being, before polymerization, unsubstituted monomeric ethylene, said interpolymer containing 5 to 40% by weight ethylene and a minor amount of allyl glycidyl ether of at least about 0.5% up to about 10% by weight based on the vinyl acetate.

2. A coated woven fabric having on at least one face thereof a coating deposited from a vinyl acetate-ethylene-allyl glycidyl ether interpolymer latex comprising an aqueous medium having colloidally suspended therein a vinyl acetate-ethylene-allyl glycidyl ether interpolymer, the ethylene in said interpolymer being, before polymerization, unsubstituted monomeric ethylene, said interpolymer containing 5 to 40% by weight ethylene and a minor amount of allyl glycidyl ether of at least about 0.5% up to about 10% by weight based on the vinyl acetate.

3. A coated woven fabric as defined in claim 2 wherein said vinyl acetate-ethylene-allyl glycidyl ether interpolymer has in said aqueous medium a particle size of $0.1\mu$ to $2\mu$.

References Cited
UNITED STATES PATENTS

| | | | |
|---|---|---|---|
| 2,703,794 | 3/1955 | Roedel | 260—80.5 |
| 3,223,670 | 12/1965 | Cantor et al. | 260—80.5 |

SAMUEL H. BLECH, Primary Examiner

U.S. Cl. X.R.

117—139.5; 260—8, 17.4, 27, 29.6, 78.5, 79.3, 80.72

PO-1050
(5/69)

UNITED STATES PATENT OFFICE
CERTIFICATE OF CORRECTION

Patent No. 3,526,540      Dated September 1, 1970

Inventor(s) M. K. Lindemann and R. P. Volpe

It is certified that error appears in the above-identified patent and that said Letters Patent are hereby corrected as shown below:

Col. 2, line 16, "Particular" should read -- Particularly --.

Col. 3, line 47, before "represented" should be inserted -- be --;
       line 65, "polyethylene" should read -- polyoxyethylene --.

Col. 4, line 30, "hydrophoric" should read -- hydrophobic --;
       line 33, "90°F" should read -- 190°F --;
       line 47, "vention" should read -- tion --.

SIGNED AND SEALED
NOV 17 1970

(SEAL)
Attest:

Edward M. Fletcher, Jr.
Attesting Officer

WILLIAM E. SCHUYLER, JR.
Commissioner of Patents